US007260668B2

United States Patent
Franke

(10) Patent No.: US 7,260,668 B2
(45) Date of Patent: Aug. 21, 2007

(54) NETWORK CO-PROCESSOR FOR VEHICLES

(75) Inventor: Jörg Franke, Freiburg (DE)

(73) Assignee: Micronas GmbH, Freiburg (DE)

( * ) Notice: Subject to any disclaimer, the term of this patent is extended or adjusted under 35 U.S.C. 154(b) by 224 days.

(21) Appl. No.: 10/077,472

(22) Filed: Feb. 14, 2002

(65) Prior Publication Data

US 2002/0120888 A1    Aug. 29, 2002

(30) Foreign Application Priority Data

Feb. 14, 2001    (EP)    .................................. 01103440

(51) Int. Cl.
    *G06F 13/36*    (2006.01)
(52) U.S. Cl. .................... 710/308; 709/216; 709/212
(58) Field of Classification Search ................ 709/212, 709/216; 711/147; 710/308
    See application file for complete search history.

(56) References Cited

U.S. PATENT DOCUMENTS

| | | | | |
|---|---|---|---|---|
| 4,604,683 A | * | 8/1986 | Russ et al. .................. 710/100 |
| 5,303,344 A | * | 4/1994 | Yokoyama et al. .......... 709/230 |
| 5,408,661 A | * | 4/1995 | Kuranaga ....................... 710/1 |
| 5,586,263 A | * | 12/1996 | Katsumata et al. .......... 710/308 |
| 5,619,726 A | * | 4/1997 | Seconi et al. ................. 710/22 |
| 5,642,482 A | * | 6/1997 | Pardillos ...................... 709/222 |
| 5,765,036 A | * | 6/1998 | Lim ............................. 711/147 |
| 5,828,856 A | * | 10/1998 | Bowes et al. ................ 710/308 |
| 5,878,217 A | * | 3/1999 | Cherukuri .................... 709/212 |
| 5,889,816 A | * | 3/1999 | Agrawal et al. ............. 375/220 |
| 5,896,386 A | * | 4/1999 | Johnston ...................... 370/466 |
| 5,937,169 A | * | 8/1999 | Connery et al. ............. 709/250 |
| 6,041,058 A | * | 3/2000 | Flanders et al. ............. 370/401 |
| 6,151,316 A | * | 11/2000 | Crayford et al. ............ 370/356 |
| 6,173,333 B1 | * | 1/2001 | Jolitz et al. ................. 709/240 |
| 6,175,915 B1 | | 1/2001 | Cashman et al. ............ 712/227 |

(Continued)

FOREIGN PATENT DOCUMENTS

WO    WO94/15295    7/1994

OTHER PUBLICATIONS

Osbourne et al., "DART-A Low Overhead ATM Network Interface Chip," XP-00210321; Jul. 1996, pp. 1-12.

(Continued)

*Primary Examiner*—Scott Baderman
*Assistant Examiner*—Paul Contino
(74) *Attorney, Agent, or Firm*—O'Shea, Getz & Kosakowski, P.C.

(57) ABSTRACT

A network processor exchanges data of various descriptions via a plurality of network nodes with external network devices, such as other processors, controllers, transducers, or sensors. The network processor includes a master processor for control tasks of the processor, and a network coprocessor for supporting network tasks. A first and a second bus system, associated with the master processor and the network coprocessor with its associated functional units, particularly Data Link Layer memory devices, respectively, serves to separate the two fields of tasks from each other. This permits both a support of gateway functions and a support of Higher Layer functions. Higher Layer memory devices, whose messages are ultimately sent or received by the master processor, are accessible from the master processor or the network coprocessor directly or indirectly via the first and/or second bus systems.

6 Claims, 5 Drawing Sheets

U.S. PATENT DOCUMENTS

| | | | |
|---|---|---|---|
| 6,304,973 B1* | 10/2001 | Williams | 713/201 |
| 6,308,238 B1* | 10/2001 | Smith et al. | 710/310 |
| 6,427,169 B1* | 7/2002 | Elzur | 709/224 |
| 6,526,446 B1* | 2/2003 | Yang et al. | 709/230 |
| 6,591,302 B2* | 7/2003 | Boucher et al. | 709/230 |
| 6,629,288 B1* | 9/2003 | Bernath et al. | 714/807 |
| 6,658,480 B2* | 12/2003 | Boucher et al. | 709/239 |
| 6,732,255 B1* | 5/2004 | Ling et al. | 712/42 |
| 6,748,479 B2* | 6/2004 | Sano et al. | 710/316 |
| 6,968,386 B1* | 11/2005 | Benayoun et al. | 709/231 |
| 2001/0025315 A1* | 9/2001 | Jolitz | 709/231 |
| 2001/0043614 A1* | 11/2001 | Viswanadham et al. | 370/469 |
| 2005/0149693 A1* | 7/2005 | Barry | 712/34 |
| 2006/0020771 A1* | 1/2006 | Kunimatsu et al. | 712/34 |
| 2006/0095723 A1* | 5/2006 | Moyer et al. | 712/34 |

OTHER PUBLICATIONS

Jens Eltze, "Double-CAN Controller as Bridge for Different CAN Networks" CiA; 1997, pp. 17-23.

Peter Hank "New Generation of CAN Controller Supporting Higher Layer Protocals," CiA; 1999, pp. 27-33.

"82596CA High-Performance 32-Bit Local Area Network Coprocessor"; Intel Corporation Data Sheet, Oct. 1995; pp. 1-76.

Lersch et al. "OSEK Communication Specification", Version 1.00, Sep. 11, 1995, COM Specification 1.00.

* cited by examiner

NETWORK CO-PROCESSOR FOR VEHICLES

BACKGROUND OF THE INVENTION

This present invention relates to the field of microprocessors, and in particular to a networked processor having a network co-processor, for use in a motor vehicle.

In automobiles, microprocessors (hereinafter generally referred to as "processors") in combination with various transducers and sensors, are performing a wide variety of control, monitoring and indicating functions. The processors, transducers, and sensors, which are relatively far apart from each other in the vehicle, typically exchange data or signals via standardized automotive networks whose active data interfaces handle the data traffic via standardized protocols and bus lines. The processors control the data exchange (i.e., the network management tasks) via suitable additional executable programs or suitable additional circuits. The areas of the processor that execute the network management tasks with this additional software and hardware can be referred to as a "network processor".

Known motor vehicle network standards include: the Controller Area Network (CAN), K-Line Interface, Vehicle Area Network (VAN), J1850, SPI Net, and TTP. Each of these networks generally employs a two-wire bus over which packetized data is transferred according to the respective standardized data format and protocol. For example, in the CAN network, each packet contains up to eight 8-bit words and the data transfer is serial. The data transfer rate is adapted to the field of tasks of the data to be transferred, and ranges for example from 125 to 500 kbs. For example air conditioning control may be assigned a low bit rate and low priority, while braking and anti-slip control for the individual wheels may be assigned a high bit rate and high priority.

If more than two nodes are connected to a network processor, a priority controller is necessary to control contention in the event of simultaneous access to the data bus. In addition, measures have to be taken that permit the transfer of larger amounts of data by partitioning the data into packets at the sending end, and sending the packets separately. At the receiving end the packets are reassembled in the correct order to reconstruct the message for further processing.

These control functions are performed under the control of executable software within the respective processor (e.g., generally in the associated RAM/ROM memories). The software has a three-layer structure, with the individual layers corresponding to a hierarchically organized functional sequence of the data transfer. A detailed description of such a network or transmission standard can be found, for example, in a document provided by the OSEK Group (i.e., in German, Offene Systeme und deren Schnittstellen für die Elektronik im Kraftfahrzeug, and in English, Open Systems and the Corresponding Interfaces for Automotive Electronics), entitled "*OSEK Communication Specification*", Version 1.00, Sep. 11, 1995, COM Specification 1.00. For the further considerations, however, a brief outline of these three layers will be sufficient.

The lowest of the three layers is the Data Link Layer (DLL), which is concerned with the transfer of the packet data format and determines the associated data format and the degree of error correction. This layer also controls priority in the event of a collision, handles the communications protocol, and controls the hardware required as network drivers in the respective nodes.

The overlying layer is the Transport Layer (TL), which permits the exchange of data that cannot be accommodated in a single packet due to its length. At the sending end, a transport protocol is created so that at the receiving end, the individual transmitted segments can first be stored and then be reassembled in proper sequence. The number of associated segments and other important information, such as the type of content, are also recorded in the transport protocol and transferred. The counterpart of exceptionally long information is short information, for instance the transfer of a single bit. To prevent the network from being blocked for the entire duration of the transmission of a packet with a size of, for example 8×8 bits, including the header information, a short message can be activated by transport layer.

Support of the Higher-Layer function is possible by a Transport Layer coprocessor that relieves the processor of the task of translating the messages of the Transport Layer into the respective node messages (i.e., into the associated DLL message). At the same time, the interrupt load on the processor proper is reduced, since the interrupts are initiated not after each transfer of a node message, but only after transfer of a Transport Layer message. An example of such support is described in the publication "Proceedings ICC '99, 6th International CAN Conference", Turin, 2 to 4 November, page 09-27 to page 09-33, in an article entitled "*New Generation of CAN Controller Supporting Higher Layer Protocols*".

A problem with these conventional vehicle networks is the load placed on the processor to support the transmission of data over the network. Therefore, there is a need for a vehicle network system that reduces the processing load associated with the network tasks on the main processor.

SUMMARY OF THE INVENTION

Briefly, according to an aspect of the present invention, a network processor includes a master processor that communicates over a first network bus, a plurality of network nodes and a network coprocessor. The network processor performs network control tasks via a second network bus.

Advantageously, providing a network co-processor between a main processor and the network nodes reduces the processing load, and the load reduction is not limited to a particular network standard, since the access by the network coprocessor to the HL and DLL network memories applies for all nodes. Furthermore, extensions of the operating-system support are possible via the Interaction Layer. Via a direct access to the memory of the (master) processor, the effective performance of the latter is reduced. Moreover, error protection during data transfers can be improved. Finally, an extension of diagnostic functions is possible.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
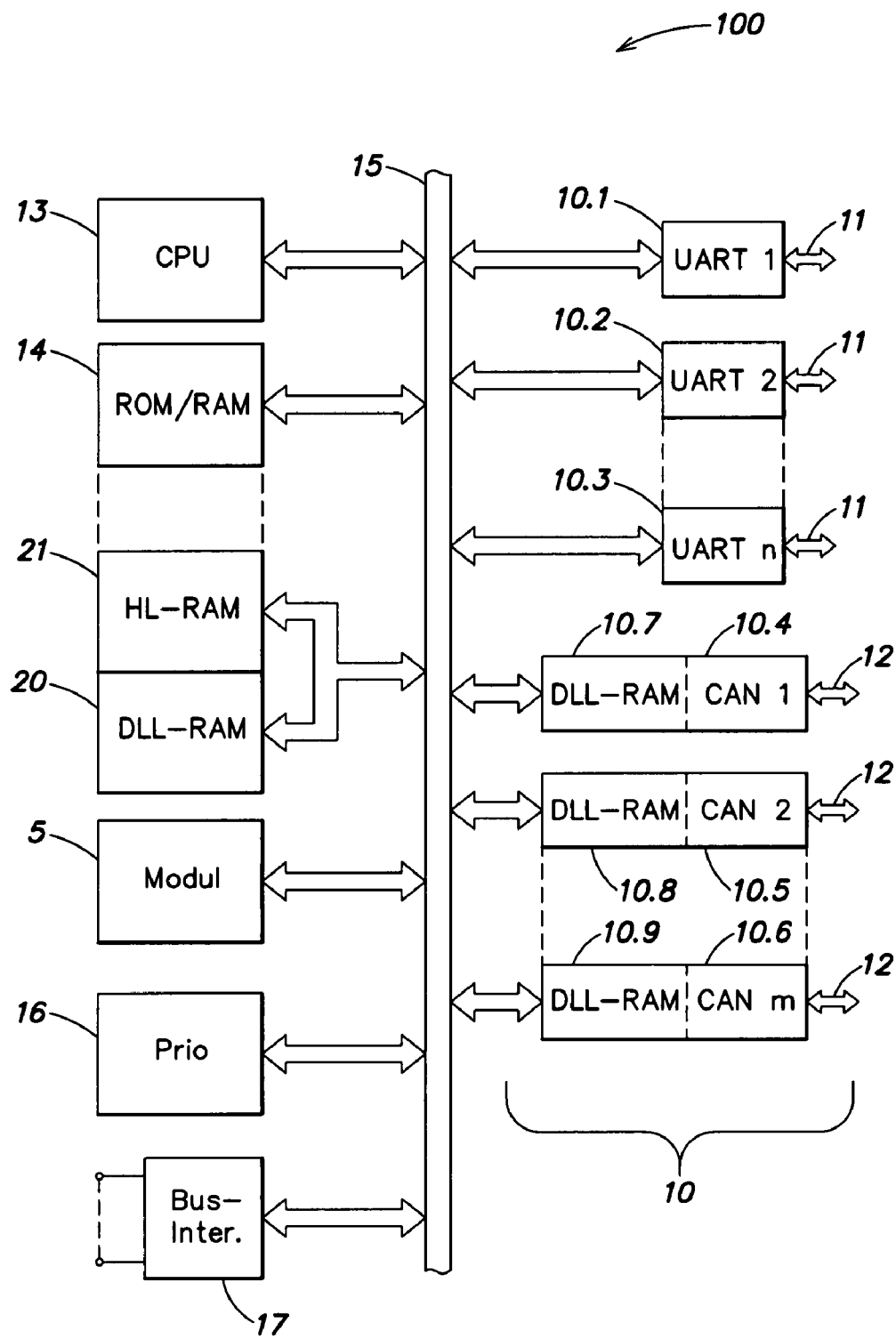
FIG. 1 is a block diagram illustration of a conventional microprocessor with functional units for performing network tasks.

FIG. 1 is a block diagram illustration of a conventional network microprocessor 100 with functional units for performing network tasks. The microprocessor 100 includes functional units that can also attend to network tasks that have to be performed in connection with the data to be exchanged via a plurality of network nodes 10. The network nodes 10 are connected via external data lines 11, 12 to devices such as other microprocessors, sensors, transducers, and other data or signal sources (not shown), which exchange data to a microprocessor unit 13, also referred to as a central processing unit (CPU). Data communication traffic within the microprocessor 100 between the individual functional units is via a central bus 15. In the interest of clarity and ease of illustration, essentially only the functional units for the pure network tasks are shown.

A ROM/RAM 14 holds the fixed or modifiable programs for the CPU 13, which are called by the CPU if required or start automatically during system startup. The microprocessor 100 also includes a module 5, which symbolizes various functional units, such as for example error protection, an engine control program, and the like. The priority logic 16 schedules priorities for the individual functional units to prevent contention on the bus 15. An external bus interface 17 permits the bus 15 to be accessed from outside. The other functional units of FIG. 1 relate to functions in connection with the data exchange with the external network or the various external networks.

The network nodes 10 illustrated in FIG. 1 are divided into two groups: (i) a plurality of UART network nodes 10.1, 10.2, 10.3, and (ii) a plurality of CAN network nodes 10.4, 10.5, 10.6. Nodes operating according to other network standards are not shown in FIG. 1; they would have to be connected to the bus 15 in a similar manner. Each of the CAN nodes 10.4 to 10.6 includes an associated DLL RAM 10.7, 10.8, 10.9, respectively, which buffers the data received or to be output via the CAN node. The RAM is typically configured as a FIFO device. In the case of the UART nodes 10.1 to 10.3, this optional buffer may be dispensed with since the data to be transferred generally have only two states, which can be stored by the respective UART node itself.

The DLL RAMs preceding the CAN nodes 10.4 to 10.6 contain the above-mentioned DLL messages or at least part thereof, while the other part is stored in DLL RAM 20. In addition to storing the DLL messages, the RAM may hold the Higher Layer (HL) messages in another memory area 21. In FIG. 1, these two memory areas 20, 21 are therefore shown together and connected to the central bus 15 by a single bus link. The RAM area of the ROM/RAM block 14 and the other RAM areas 20, 21 may be contained in a common read-write memory, which is indicated by the dashed lines between blocks 14 and 21.

Figure 2:
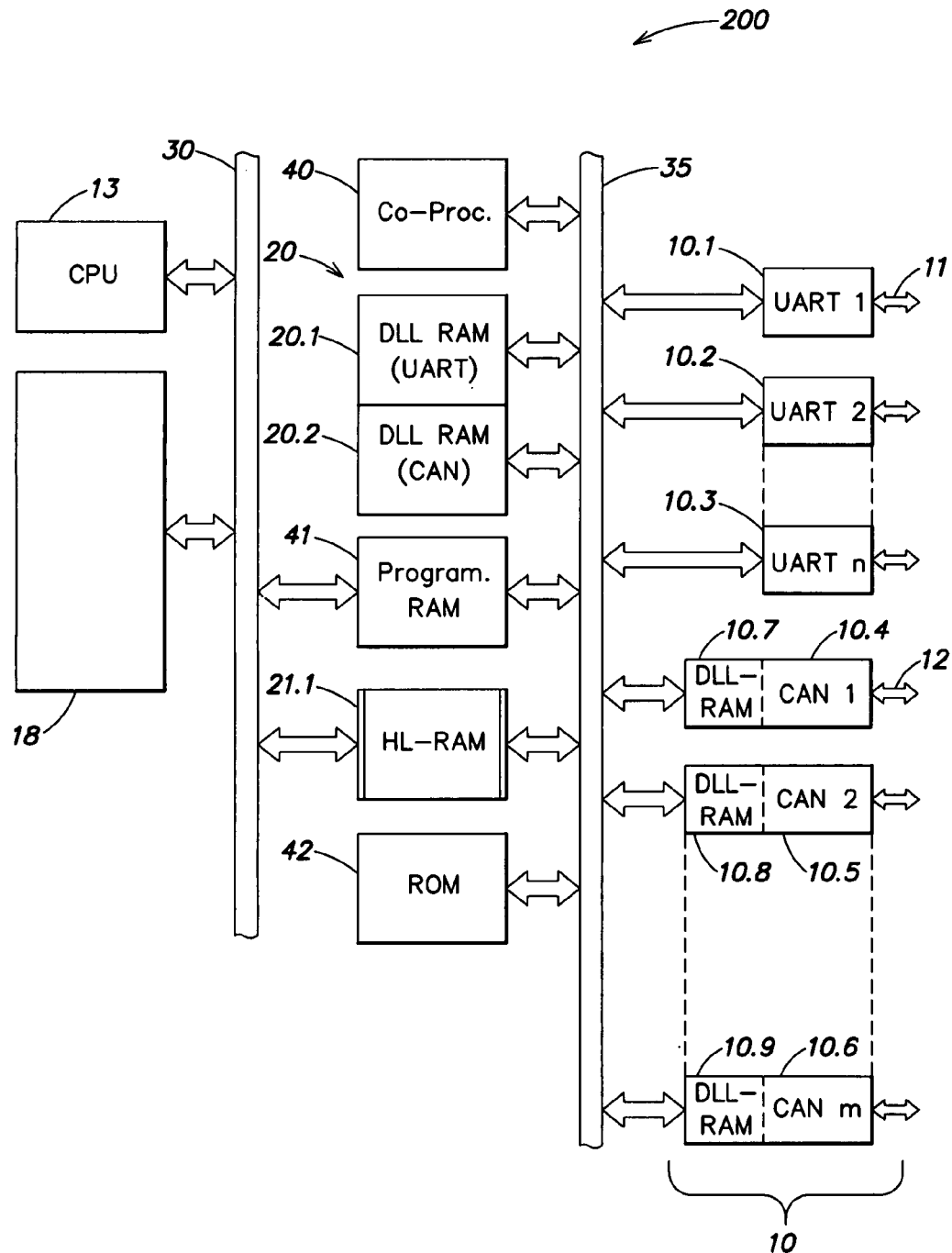
FIG. 2 is a block diagram illustration of a first embodiment of a network processor that includes a master processor and a network coprocessor, and a two bus system.

FIG. 2 is a block diagram illustration of a first embodiment of a processor 200 that includes a master processor and a network coprocessor, and a two bus system. For the sake of clarity, functional units described in connection with FIG. 1 are designated by the same reference number, and shall not be discussed again in the interest of brevity. The processor 200 includes two control or arithmetic units 13, 40. The first CPU 13 can be referred to as a "master processor". The second CPU 40 can be referred to as a "network coprocessor" or "coprocessor", and performs the network tasks. To prevent the network tasks from colliding with the tasks of the master processor 13 on the internal bus, the microprocessor 100 includes a second bus system 35 for the network tasks, which also has the network nodes 10 connected to it. The functional units of the master processor 13 that are associated with the network tasks are combined in a block 18, which is connected to the first bus system 30. Also connected to the first bus system 30 is a two-port HL RAM 21.1, whose other port is connected to the second bus system 35. A program RAM 41 stores specific programs for the coprocessor 40 that are loaded from the master processor 13 into the coprocessor 40 via the first bus system 30. The program RAM 41 is also connected to the second bus system 35 to permit communication with the coprocessor 40. A two-port function is not necessary, because simultaneous access from both bus systems 30, 35 to the program RAM 41 is avoidable.

The DLL RAM 20 includes a first area 20.1 for the UART messages and a second area 20.2 for the CAN messages. A ROM 42 is also connected to the second bus to facilitate fast booting of the coprocessor 40 during system startup, for example.

Figure 3:
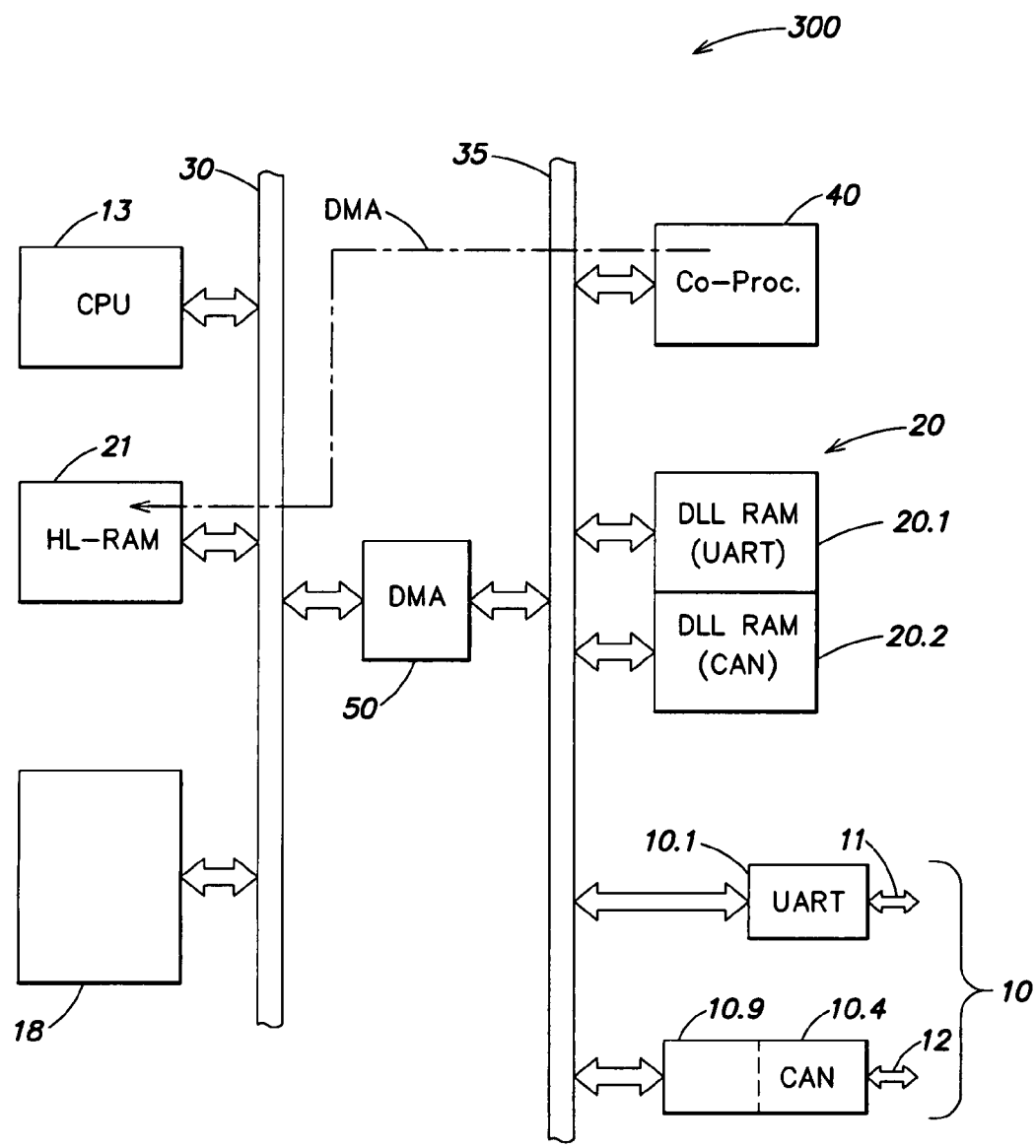
FIG. 3 is a block diagram illustration of an alternative embodiment network processor, in which HL RAM is associated with the master processor.

FIG. 3 illustrates an alternative embodiment network processor 300. The network processor 300 is substantially similar to the network processor 200 (FIG. 2) with the principal exception that the HL RAM 21 cannot be reached by the coprocessor 40 directly via the second bus system 35, since the data path goes via the second bus system 35 and then via the first bus system 30. The two bus systems are coupled via a direct memory access (DMA) device 50 between the second and first bus systems 30, 35. The coprocessor 40 can retrieve messages from the HL RAM 21 with high priority via the DMA device 50. During the retrieval the current functions of the master processor 13 are interrupted.

Such a microprocessor architecture will be advantageous if the contents of the HL RAM 21 are continuously adapted by the master processor 13, while retrievals by the coprocessor 40 are relatively rare, so that the interruptions of the main program can be considered to be insignificant.

Figure 4:
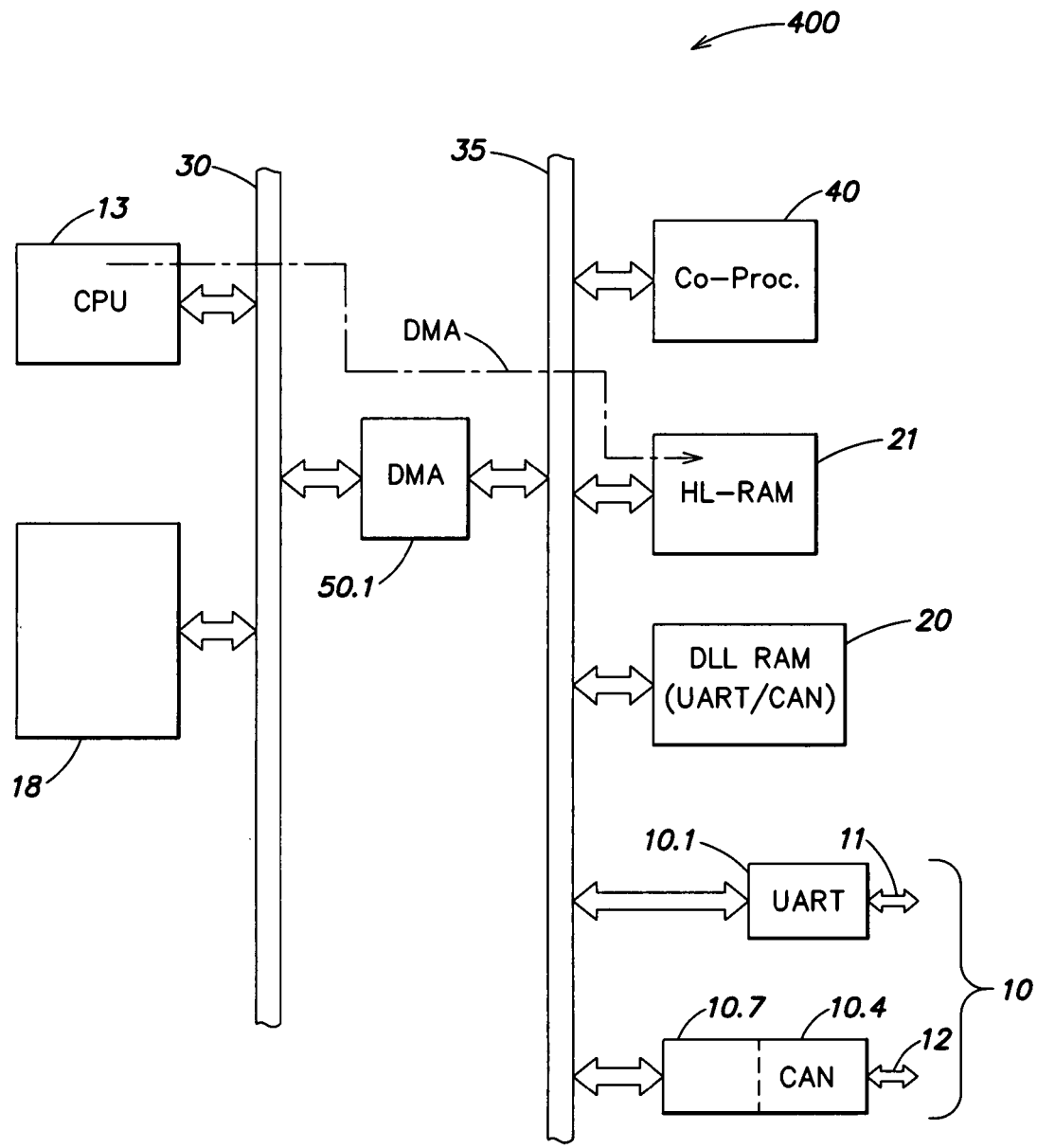
FIG. 4 is a block diagram illustration of yet another alternative embodiment network processor, in which the HL RAM is associated with the network coprocessor.

FIG. 4 illustrates yet another alternative embodiment network processor 400. The network processor 400 is substantially similar to the network processor 300 (FIG. 3), with the principal exception that this device works in the other direction (i.e., from the first bus system 30 to the second bus system 35). Specifically, the HL RAM 21 is connected to the second bus system 35. If the master processor 13 wants to access or modify the messages in the HL RAM 21, it will access the HL RAM 21 with high priority by direct memory access device 50.1, and interrupts the respective network function of the coprocessor 40.

This architecture and location of the HL RAM 21 is particularly advantageous if the master processor 13 has to access the HL RAM 21 infrequently, while the coprocessor 40 has to frequently access the network nodes 10.

Figure 5:
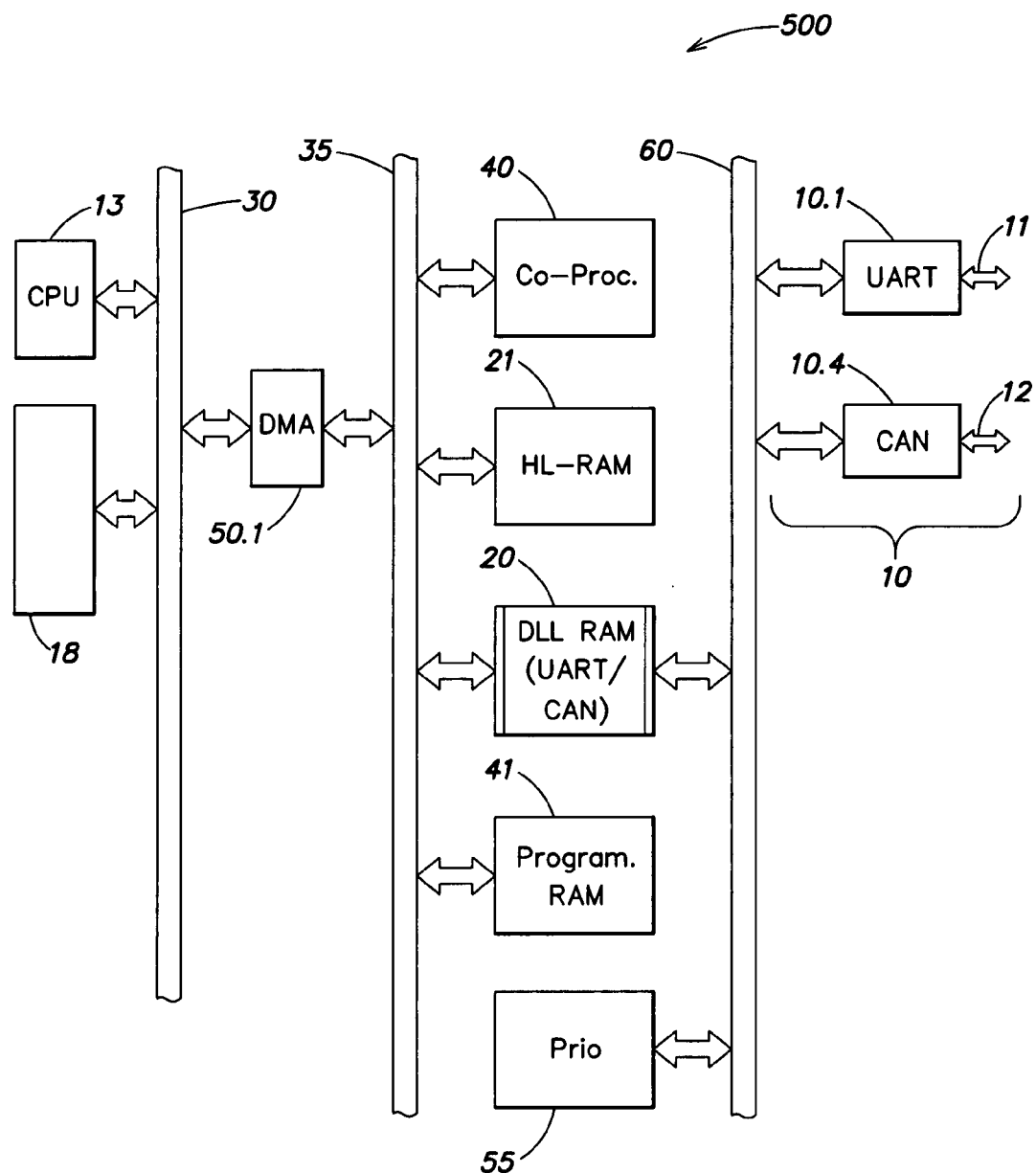
FIG. 5 is a block diagram illustration of still another alternative embodiment network processor that includes a main processor and a network coprocessor, and three bus systems for separating the network tasks from the processor tasks.

FIG. 5 illustrates still another alternative embodiment network processor 500. The network processor 500 is substantially similar to the network processor 400 (FIG. 4), with the principal exception that a third bus system 60 is provided, to which the network nodes 10, the DLL RAM 20, and the priority logic 55 are connected. The other functional units (e.g., coprocessor 40, HL RAM 21, program RAM 41, direct memory access unit 50.1, and the second input/output of DLL RAM 20) are connected to the second bus system 35. The priority logic 55 is necessary because the coprocessor 40 is not directly connected to the third bus system 60, and as a result cannot perform the contention control function in the event of simultaneous access by the network nodes 10. One advantage of this arrangement is that the nodes 10 do not require separate DLL RAMs 10.7-10.9 (FIG. 1), since the DLL RAM 20 is connected to the individual nodes 10.1, 10.4 via the third bus system 60. With this arrangement, multiple utilization of the individual DLL RAM areas is readily possible as several nodes 10 are interconnectable with a single DLL message, since the messages are identical.

One of ordinary skill in the art will recognize that designations contained in the description should not be interpreted in a limiting sense. In addition, reference to ROMs and RAMs of course does not exclude other memory types, such as the increasing use of erasable memories (e.g., flash memories) as read-write memories, because such memories do not lose the stored information when power is removed. For tasks in which a continuous supply of power is not ensured, such memories are desirable. Such an application is found in automobiles, for example, since the battery has to be changed from time to time even in a battery-saving standby mode. Operating data about the number of kilometers covered, services carried out, etcetera, must not be lost. The separation of the network functions from the processor tasks proper also permits secure storage of such data in protected memory areas of the master processor, whose contents are not readily accessible or even deliberately modifiable.

Although the present invention has been shown and described with respect to several preferred embodiments thereof, various changes, omissions and additions to the form and detail thereof, may be made therein, without departing from the spirit and scope of the invention.

What is claimed is:

1. A network processor, comprising:
a master processor;
a network coprocessor;
at least one network node;
a first bus system connected to the master processor;
a second bus system connected to the at least one network node and the network coprocessor;
a first network memory that stores first layer messages, the first network memory being connected to the second bus system, the first network memory containing messages to be read or written for the at least one network node;
a second network memory that stores second layer messages, the second network memory being connected to the first bus system, the second network memory containing information serving to convert the first layer messages to be read or written; and
a direct memory access device that directly connects the first bus system to the second bus system and allows for direct memory access between the second network memory and the network coprocessor through the first and second bus systems by passing data from the network coprocessor directly through the direct memory access device to the second network memory.

2. The network processor of claim 1, where the at least one network node has a separate memory area.

3. A network processor, comprising:
a master processor;
a network coprocessor;
at least one network node;
a first bus system connected to the master processor;
a second bus system connected to the at least one network node and the network coprocessor;
a first network memory that stores first layer messages, the first network memory being connected to the second bus system;
a second network memory that stores second layer messages, the second network memory being connected to the second bus system; and
a direct memory access device that directly connects the first bus system and the second bus system and allows for direct memory access between the master processor and the second network memory through the first and second bus systems by passing data from the master processor directly through the direct memory access device to the second network memory.

4. A network processor, comprising:
a master processor;
a network coprocessor;
at least one network node;
a first bus system connected to the master processor;
a second bus system connected to the network coprocessor;
a third bus system, the at least one network node being connected to the third bus system;
a first network memory that stores first layer messages, the first network memory having two ports, a first one of the two ports being connected to the second bus system, a second one of the two ports being connected to the third bus system, the first network memory containing messages to be read or written for the at least one network node;
a second network memory that stores second layer messages, the second network memory being connected to the second bus system, the second network memory containing information serving to convert the first layer messages to be read or written; and
a direct memory access device that directly connects the first bus system and the second bus system and that allows for direct memory access between the master processor and the second network memory through the first and second bus systems by passing data from the master processor directly through the direct memory access device to the second network memory.

5. The network processor of claim 4, further comprising a priority logic circuit connected to the third bus system, that provides contention control in the event of simultaneous access by more than one of the at least one network node to the third bus system.

6. A network processor, comprising:
a master processor;
a network coprocessor;
at least one network node;
a first bus system connected to the master processor;
a second bus system connected to the network coprocessor;
a third bus system, the at least one network node being connected to the third bus system;
a first network memory that stores first layer messages, the first network memory having two ports, a first one of the two ports being connected to the second bus system, a second one of the two ports being connected to the third bus system, the first network memory containing messages to be read or written for the at least one network node;

a second network memory that stores second layer messages, the second network memory being connected to the second bus system, the second network memory containing information serving to convert the first layer messages to be read or written;

a direct memory access device that directly connects the first bus system and the second bus system and that allows for direct memory access between the master processor and the second network memory through the first and second bus systems by passing data from the master processor directly through the direct memory access device to the second network memory; and a priority logic circuit connected to the third bus system, that provides contention control in the event of simultaneous access by more than one of the at least one network node to the third bus system.

* * * * *

UNITED STATES PATENT AND TRADEMARK OFFICE
CERTIFICATE OF CORRECTION

| | |
|---|---|
| PATENT NO. | : 7,260,668 B2 |
| APPLICATION NO. | : 10/077472 |
| DATED | : August 21, 2007 |
| INVENTOR(S) | : Jörg Franke |

It is certified that error appears in the above-identified patent and that said Letters Patent is hereby corrected as shown below:

<u>Column 1</u> line 37, before the paragraph beginning "If more than", insert the following paragraph --Different networks within the motor vehicle may also be interconnected via one or more network processors. This is possible if suitable interfaces are provided at the network processor. These interfaces are often referred to as "network nodes" or "nodes"--

Signed and Sealed this

Sixth Day of November, 2007

JON W. DUDAS
*Director of the United States Patent and Trademark Office*